(12) United States Patent
Mischke (10) Patent No.: US 12,264,640 B1
(45) Date of Patent: Apr. 1, 2025

(54) VAPOR CANISTER

(71) Applicant: Shop 48 LLC, Gilbert, AZ (US)

(72) Inventor: Thomas Mischke, Gilbert, AZ (US)

(73) Assignee: Shop 48 LLC, Gilbert, AZ (US)

( * ) Notice: Subject to any disclaimer, the term of this patent is extended or adjusted under 35 U.S.C. 154(b) by 0 days.

(21) Appl. No.: 18/660,973

(22) Filed: May 10, 2024

Related U.S. Application Data (60) Provisional application No. 63/503,051, filed on May 18, 2023.

(51) Int. Cl.
*B01D 53/04* (2006.01)
*F02M 25/08* (2006.01)

(52) U.S. Cl.
CPC ..... *F02M 25/0854* (2013.01); *B01D 53/0407* (2013.01); *B01D 2253/102* (2013.01); *B01D 2259/4516* (2013.01)

(58) Field of Classification Search
CPC .......................... B01D 53/04; B01D 53/0407; B01D 2253/02; B01D 2257/708; B01D 2259/4516; F02M 25/0854
USPC .... 96/134, 137, 138, 147, 149, 151; 95/146; 123/518, 519
See application file for complete search history.

(56) References Cited

U.S. PATENT DOCUMENTS

| | | | | |
|---|---|---|---|---|
| 2,199,258 A | * | 4/1940 | Gray | B01D 53/26 422/255 |
| 2,593,132 A | * | 4/1952 | Gannon | B01D 53/26 55/480 |
| 2,751,999 A | * | 6/1956 | Semon | B01D 53/26 55/513 |
| 2,767,803 A | * | 10/1956 | Northern | F25B 43/003 55/495 |
| 3,705,480 A | * | 12/1972 | Wireman | B01D 53/26 96/136 |
| 4,717,401 A | * | 1/1988 | Lupoli | B01D 53/0446 96/141 |
| 4,746,338 A | * | 5/1988 | Williams | B01D 46/30 55/482 |
| 7,285,156 B2 | * | 10/2007 | Arno | B01D 53/04 55/518 |
| 8,529,677 B2 | | 9/2013 | Schroeder et al. | |
| 9,890,745 B2 | | 2/2018 | Dudar | |
| 10,427,081 B1 | * | 10/2019 | Newman | B01D 53/0415 |

(Continued)

OTHER PUBLICATIONS

Dorman 911-261 Vapor Canister Compatible with Select Models, Amazon, published at least as early as Jul. 2021 https://www.amazon.com/Dorman-911-261-Evaporative-Emissions-Charcoal/dp/B07KFZ1WPW?source=ps-sl- shoppingads-lpcontext&ref_=fplfs&psc=1&smid=ATVPDKIKXODER.

*Primary Examiner* — Frank M Lawrence, Jr.
(74) *Attorney, Agent, or Firm* — Concourse Law Group; Katherine B. Sales, Esq.

(57) ABSTRACT

A reusable vapor canister having a hollow body section having two opposed ends and a media cavity, two end caps, wherein at least one of the end caps is configured to removably couple to one of the opposed ends of the body, each end cap having at least one hole disposed therethrough, at least two fine mesh screens, at least two support structures, and at least two O-rings. The canister can have media within the media cavity comprising charcoal, activated charcoal, and/or activated carbon. A method of using the vapor canister comprises the steps of a) providing the vapor canister; and b) coupling the vapor canister to a vent line of a fuel tank. A method of assembling same.

19 Claims, 9 Drawing Sheets

(56) References Cited

U.S. PATENT DOCUMENTS

| | | | |
|---|---|---|---|
| 2006/0207576 A1* | 9/2006 | Mills | F16K 24/044 |
| | | | 123/519 |
| 2007/0125235 A1* | 6/2007 | Begley | B63J 2/02 |
| | | | 96/147 |
| 2010/0101422 A1* | 4/2010 | Hart | B01D 53/0407 |
| | | | 96/152 |
| 2015/0040765 A1* | 2/2015 | Zastera | B01D 53/0415 |
| | | | 96/132 |
| 2015/0273379 A1* | 10/2015 | McVay | B01D 46/30 |
| | | | 96/108 |
| 2020/0377360 A1 | 12/2020 | Collet | |

* cited by examiner

VAPOR CANISTER

CROSS-REFERENCE TO RELATED APPLICATIONS

This United States Non-Provisional Patent Application claims priority to U.S. Provisional Patent Application Ser. No. 63/503,051, titled "Vapor Canister," filed May 18, 2023, the contents of which are incorporated by reference herein in their entirety.

BACKGROUND

Many vehicles have vent lines that extend from their fuel tanks. It is common for a raw fuel smell to escape from these vent lines. Not only is the raw fuel smell unpleasant, but it is a health and safety hazard as well.

Most pre-1970's vehicles and most contemporary hot rods/custom builds do not have vapor filters. Most mid-70's and newer vehicles come with plastic charcoal filters already installed, but they are sealed and not rechargeable.

Accordingly, there is a need for an improved vapor canister to reduce and/or eliminate the raw fuel smell.

SUMMARY

The present invention addresses this need. In a first embodiment, the present invention is directed to a reusable vapor canister comprising a hollow body section having two opposed ends and a media cavity, two end caps, wherein at least one of the end caps is configured to removably couple to one of the opposed ends of the body, each end cap having at least one hole disposed therethrough, at least two fine mesh screens, at least two support structures, and at least two O-rings.

Optionally, at least one of the end caps has threading along one end portion.

Optionally, at least one of the opposed ends of the body has internal threading.

Optionally, each opposed end of the body has at least one first recess configured to receive and retain at least one snap ring.

Optionally, the canister further comprises media disposed within the media cavity.

Optionally, the media comprises one or more of the following: charcoal, activated charcoal, or activated carbon.

Optionally, the media comprises a 50/50 mixture between coconut shell granular charcoal and bituminous coal pellet charcoal.

Optionally, the canister further comprises at least one snap ring.

In a second embodiment, the present invention is directed to a method of using the vapor canister. The method comprises the steps of a) providing the vapor canister; and b) coupling the vapor canister to a vent line of a fuel tank.

In a third embodiment, the present invention is directed to a method of reusing the vapor canister. The method comprises the steps of: a) providing the vapor canister; b) removing at least one end cap from the body; c) removing at least one snap ring from the body (step c) is optional as the use of snap rings is optional); d) removing at least one supporting structure from the body; e) removing at least one fine mesh screen from the body; f) removing at least some media from the media cavity; g) inserting at least some new, unused media into the media cavity; h) placing at least one fine mesh screen into the body, on top of the media; i) placing at least one supporting structure on top of the fine mesh screen; j) inserting at least one snap ring into the first recess of the body (if one or more snap rings are being used); and k) securing the end cap to the body.

DRAWINGS

These and other features, aspects, and advantages of the present invention will become better understood with regard to the following description, appended claims, and accompanying drawings.

DESCRIPTION

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Figure 1:
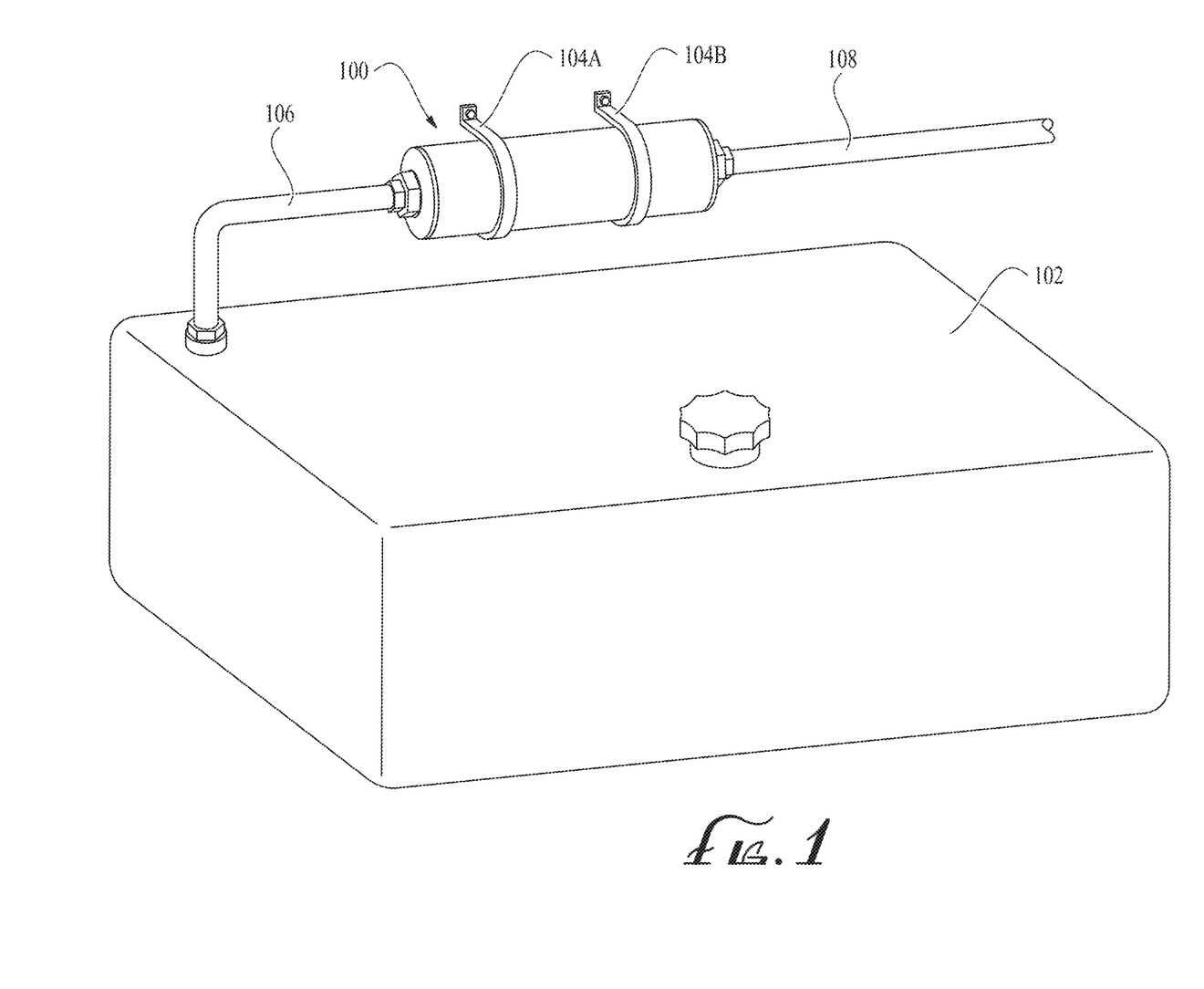
FIG. 1 is a perspective view of a vapor canister coupled to a fuel tank, having features of the present invention.
Figure 9:
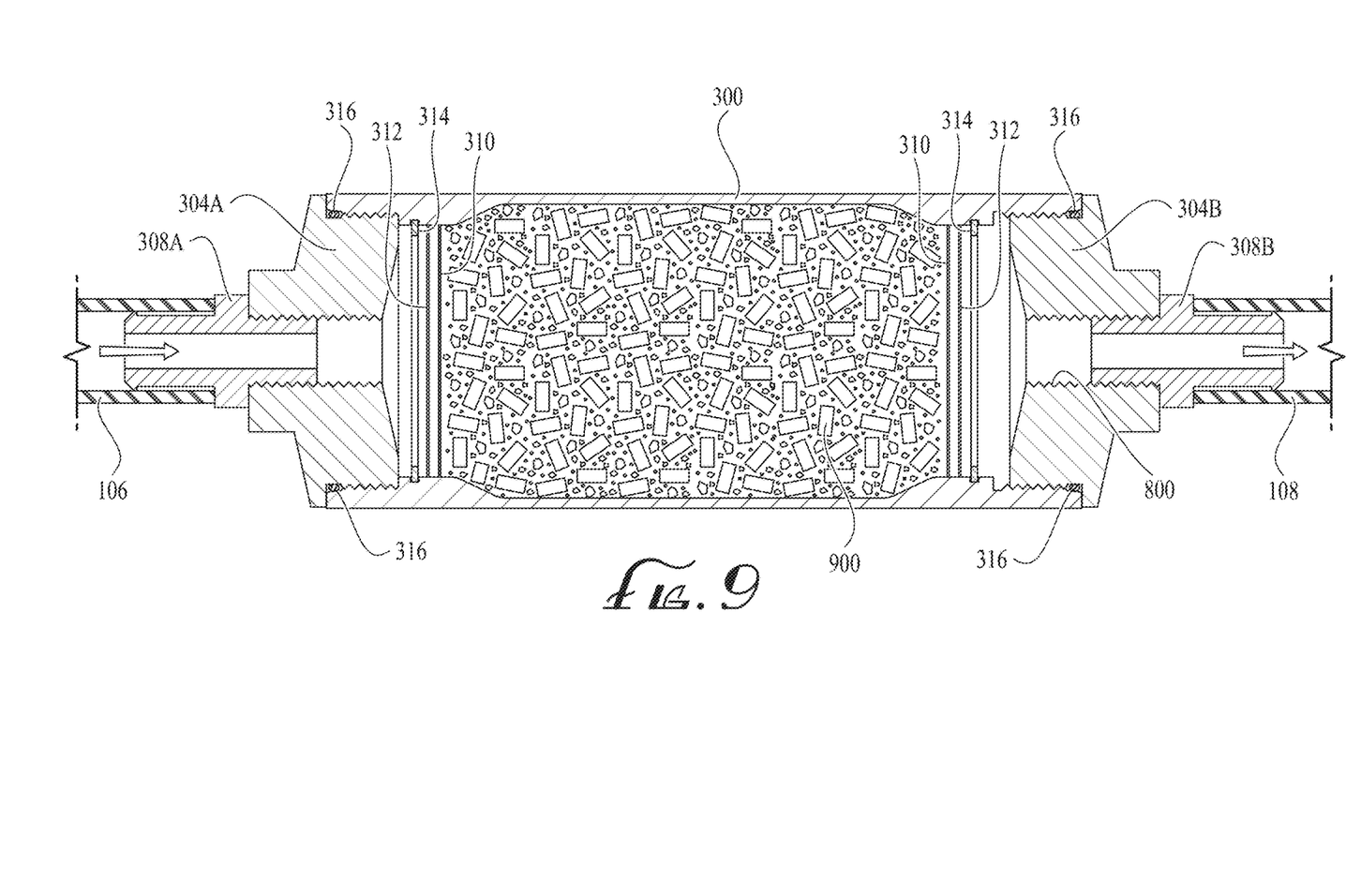
FIG. 9 is a sectional view of the fully assembled canister of FIG. 1.
Figure 10:
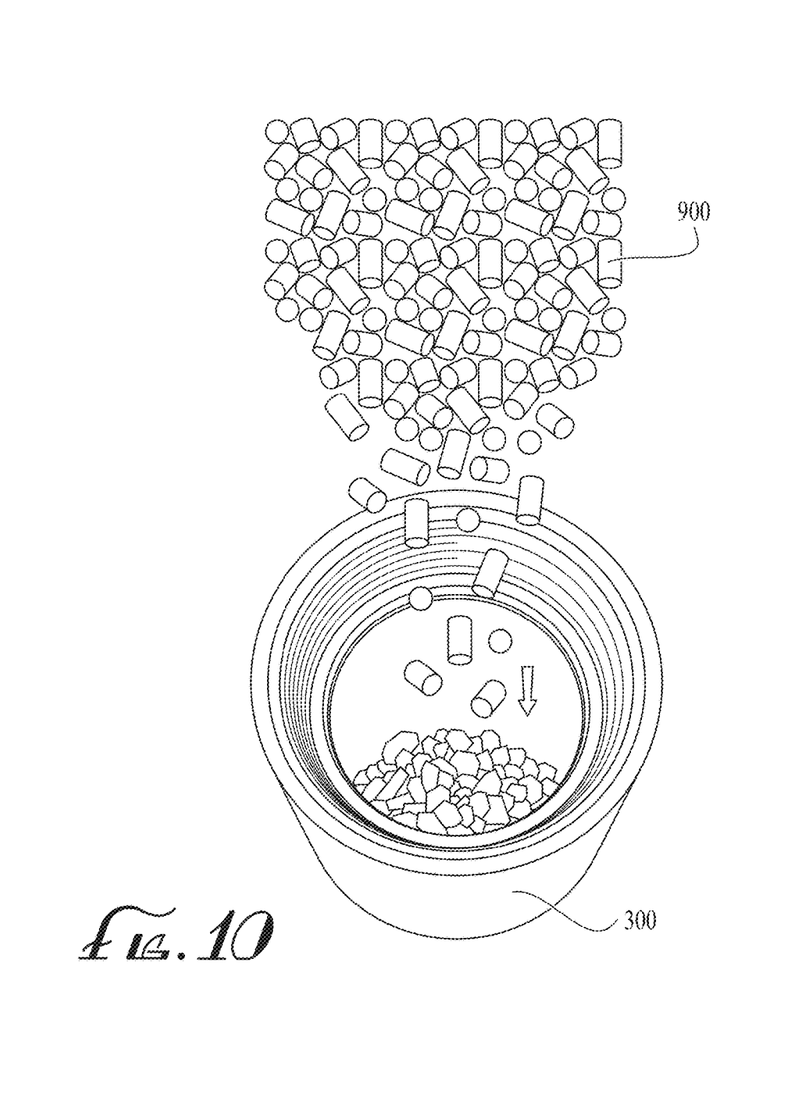
FIG. 10 is a top view of the canister of FIG. 1 being filled with material.
Figure 11:
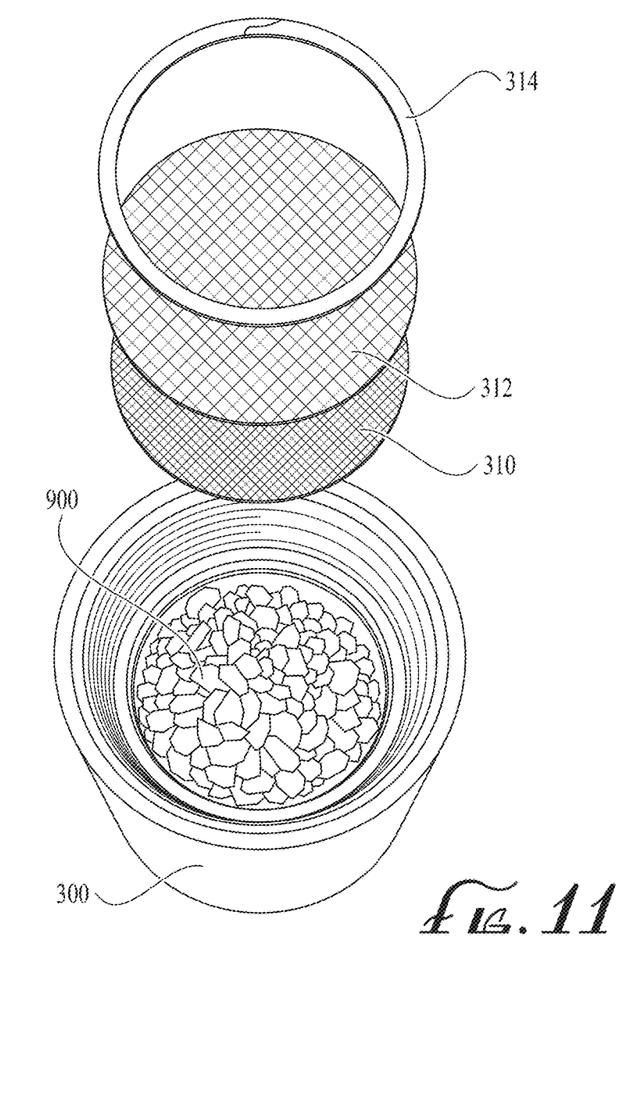
FIG. 11 is a top view of the canister of FIG. 10 wherein a fine mesh screen, support structure, and snap ring are being added to one end of the canister.
Figure 12:
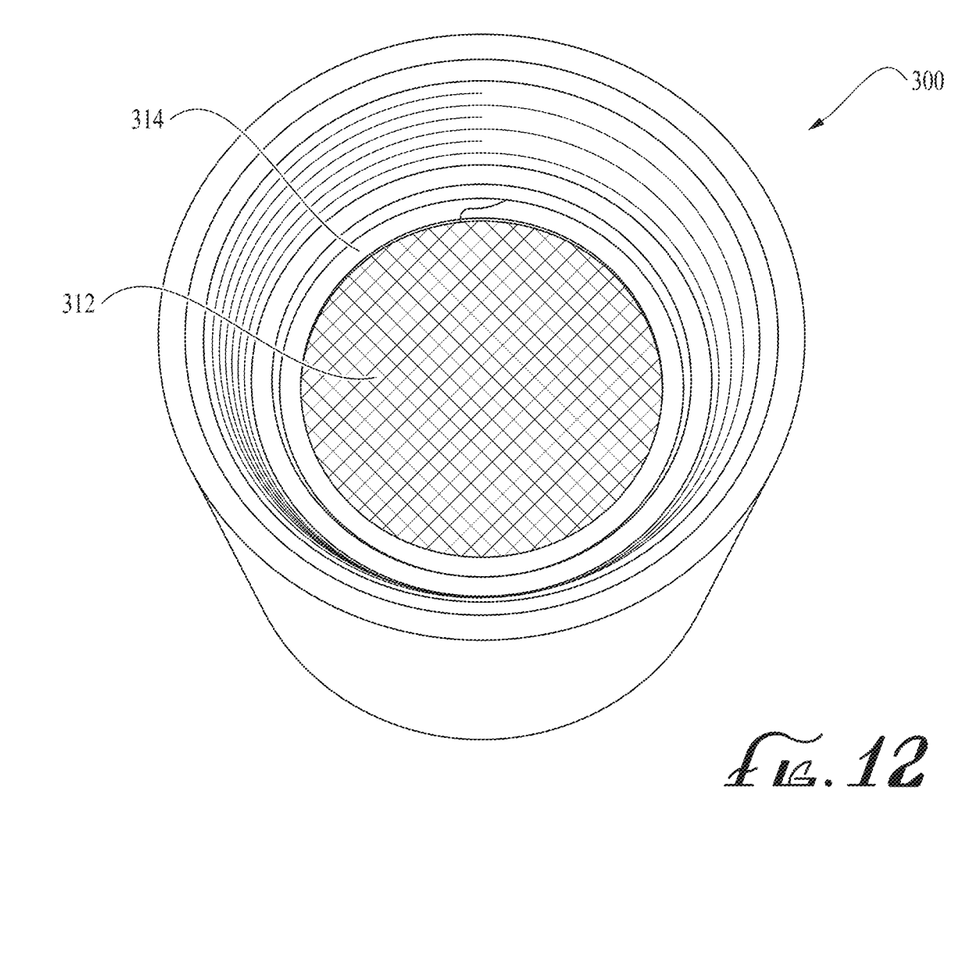
FIG. 12 is a top view of the canister of FIG. 11, wherein the fine mesh screen, support structure, and snap ring have been secured to the one end of the canister.
Figure 13:
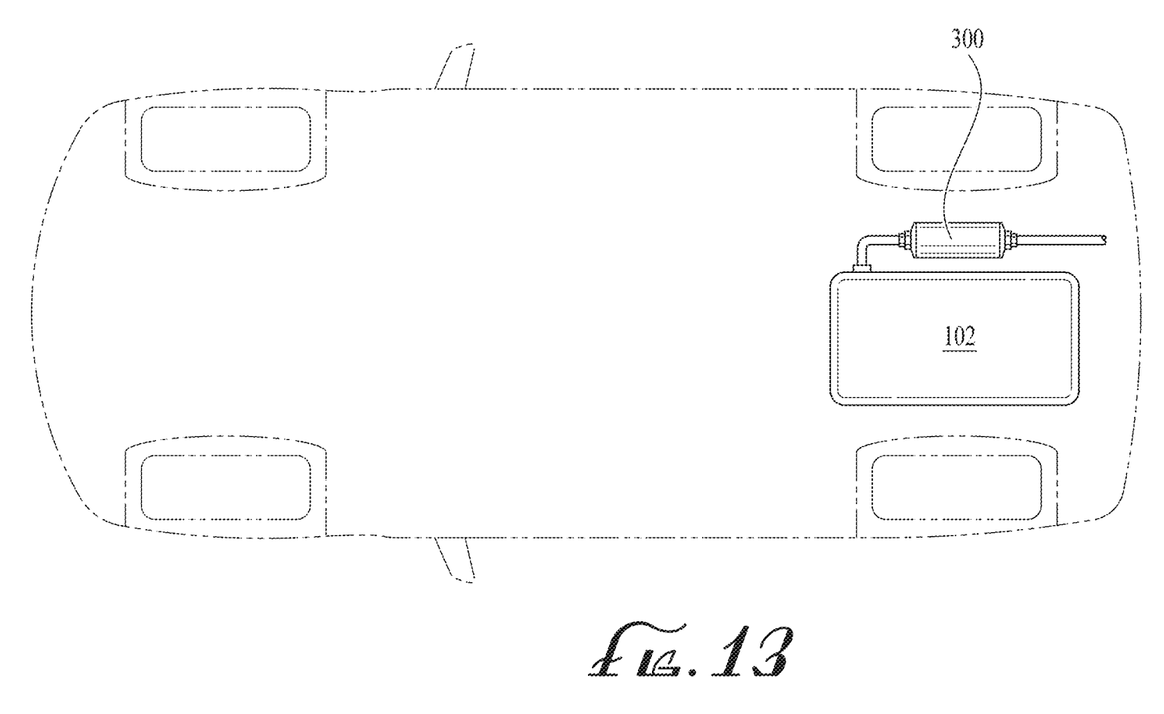
FIG. 13 is a bottom plan view of the canister of FIG. 11 installed in a vehicle.

Referring now to FIG. 1, there is shown a vapor canister 100 coupled to a gas/fuel tank 102. The canister 100 is configured to receive and retain a media 900 which is best shown in FIGS. 9 through 11.

The canister 100 is typically secured the vehicle using one or more C-straps 104A, 104B and one end of the canister 100 is connected to the fuel tank 102 by a first hollow pipe or connector 106 (vent line of the fuel tank 102). Optionally, a second hollow pipe/connector 108 is coupled to the other end of the canister 100 to allow clean air to discharge therefrom.

Figure 2:
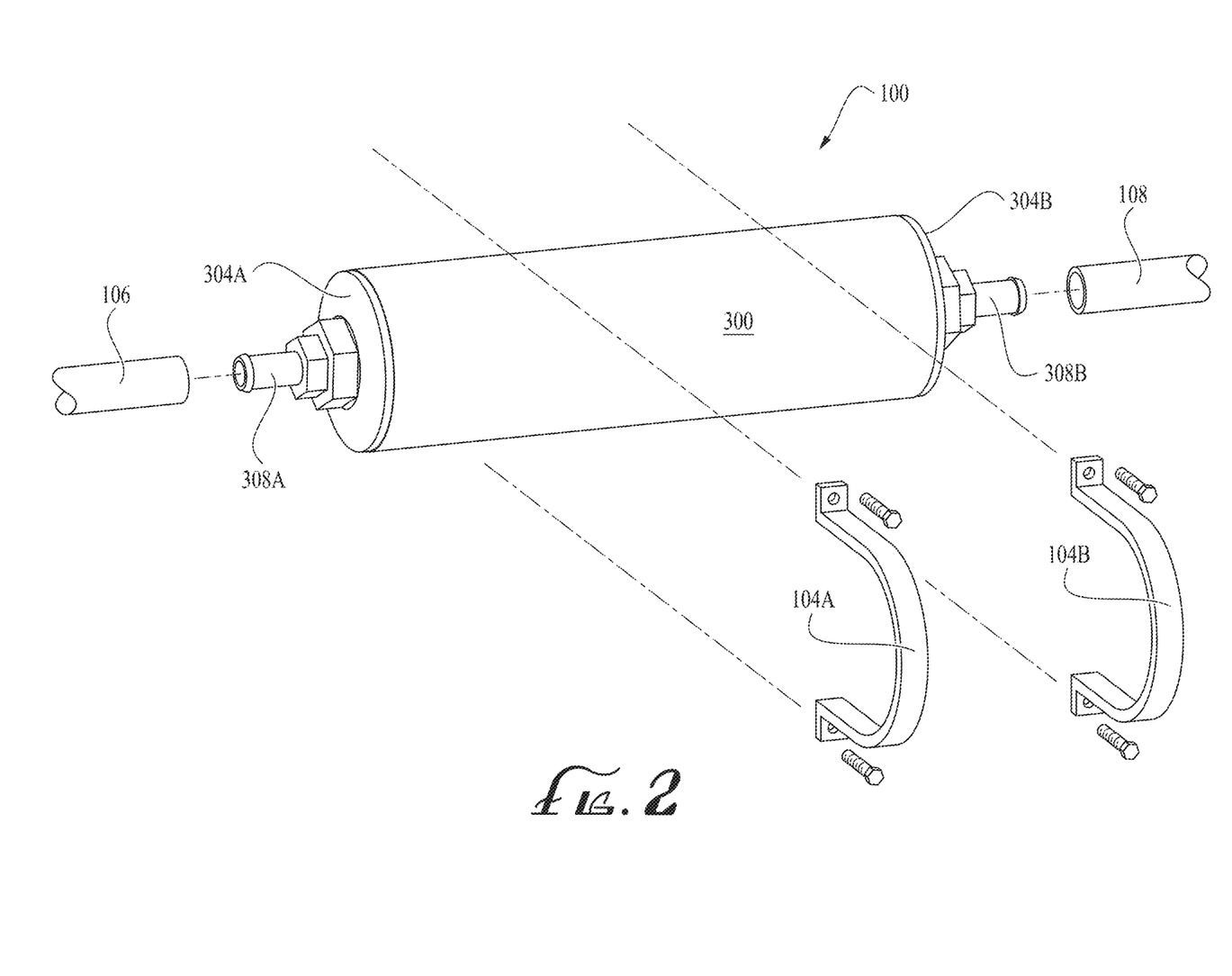
FIG. 2 is an enlarged perspective view of the vapor canister of FIG. 1 wherein C-clamps are being removed.

Referring now to FIG. 2, there is shown an enlarged view of the canister 100 of FIG. 1, wherein the C-straps 104A, 104B are being removed, and pipes/tubes/vent lines 106, 108 are disconnected from the ends of the canister 100 to allow removal of the canister 100 from the vehicle.

Figure 3:
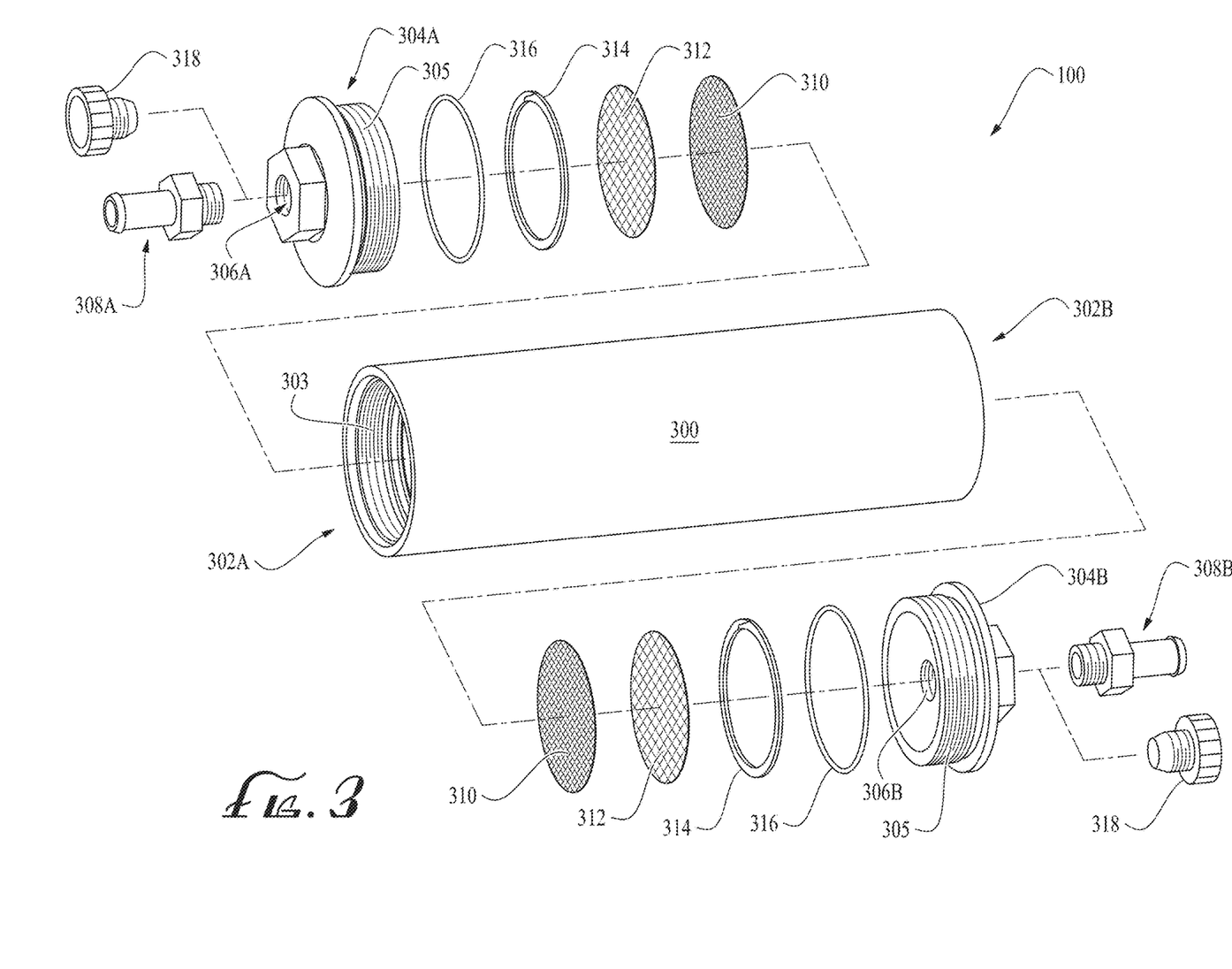
FIG. 3 is an exploded perspective view of the vapor canister of FIG. 1, wherein all components of the canister are shown.

Referring now to FIG. 3, there is shown an exploded view of the canister 100, where all the components of the canister 100 are shown. The canister 100 has a substantially hollow body section 300 with two opposed, threaded 303 end portions 302A, 302B. The body section 300 can be any length, but typical lengths include 6 inches and 8 inches. Additionally, while the body section 300 is shown as having a generally cylindrical shape with two opposed, open ends 302, this shape and configuration is not limiting, and the body section 300 can be any shape as long as it is hollow and has at least one open end. The body section 300 can be made from one or more of the following materials: metal, aluminum, steel, composite materials such as carbon fiber, plastic, or a nylon-based plastic.

Each end portion 302A, 302B is configured to removably couple to an end cap 304A, 304B, wherein each end cap 304A, 304B has threading 305 to correspond to the threading 303 in the ends 302A, 302B. Each end cap 304A, 304B has at least one center hole 306A, 306B therethrough to allow air flow to pass through the canister 100. The center holes 306A, 306B are threaded which allows them to attach to any applicably-sized fittings (typically a ⅜-inch barb end/–6AN) 308A, 308B depending on the location and orientation of the canister 100 in relation to vehicle fuel hoses and the gas tanks 102 inlet and outlet.

The canister 100 also comprises at least one pair of fine mesh screens 310, at least one pair of screen support structures 312, and at least one pair of O-rings 316. Optionally, the canister 100 also comprises at least one pair of shipping caps 318 and one or more snap rings 314.

The fine mesh screens 310 can be any diameter, but preferably, the fine mesh screens 310 are 2 inches in diameter. The screens 310 can have, but are not limited to, the following measurements/dimensions: 100×100 Mesh (Square), 0.0055"×0.0055" Opening (Square), 0.0045" Thick (50 Gauge) Wire Diameter, 30% Open Area. The use of the term "fine mesh" is not limiting and is simply used to fully describe that the screens 310 have a finer mesh as compared to the support structures 312. Preferably, but not necessarily, the screens 310 are made from metal, and more preferably, the screens 310 are made from 304 stainless steel.

The screen support structures 312 are semi-rigid structures configured to prevent the fine mesh screens 310 from bending out of position due to pressure from the media 900 being retained within the canister 100. Structures 312 can each comprise a screen with a larger mesh size (optionally a 20×20 mesh size) as compared to the fine mesh screens 310. Optionally, the structures 312 can comprise one or more grates or other rigid structures that provide the necessary strength to retain fine mesh screens 310 in their preferred positions within the canister 100.

Figure 4:
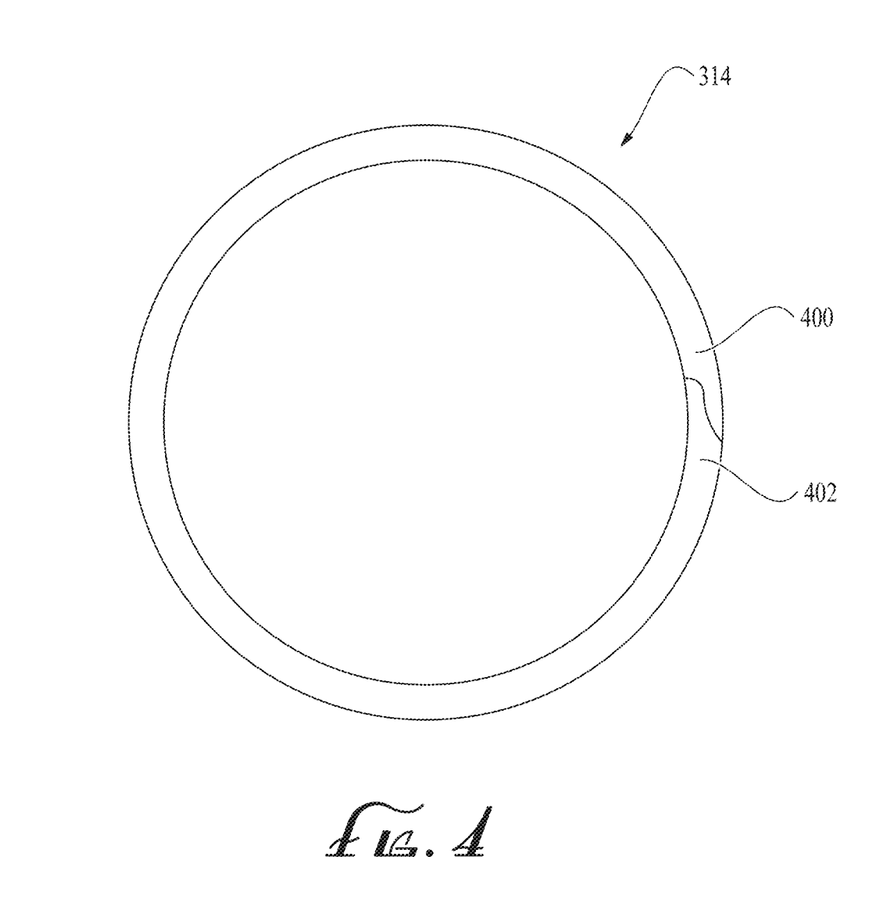
FIG. 4 is a top plan view of the snap ring shown in FIG. 3.
Figure 5:
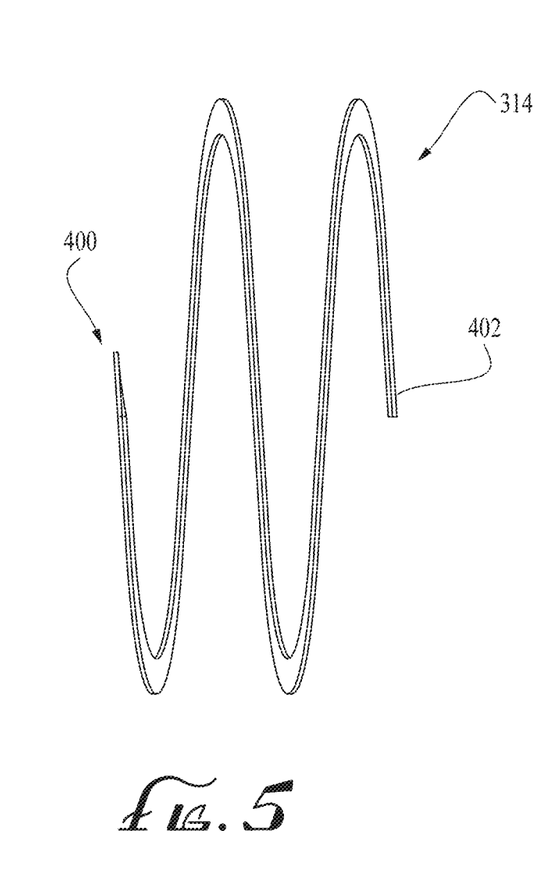
FIG. 5 is a side plan view of the snap ring of FIG. 4, wherein it has been expanded to show its coiled shape.

Referring now to FIGS. 4 and 5, one of the snap rings 314 is shown in greater detail, FIG. 4 shows the snap ring 314 from a top plan view, and FIG. 5 shows the snap ring 314 from a side plan view, wherein the ring 314 has been expanded out to show its full, coiled structure. Each snap ring 314 has two ends 400, 402 that are configured to mate with each other and form a flat surface. Note that the use of one or more snap rings 314 in the canister 100 is optional.

Figure 6:
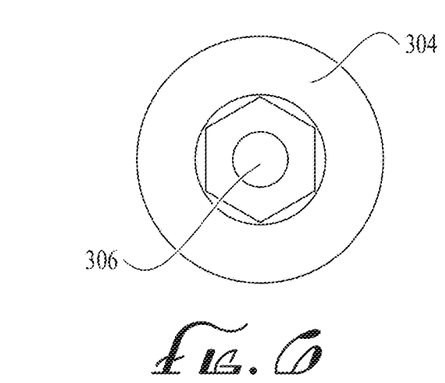
FIG. 6 is a top plan view of one end of the canister of FIG. 1.

Referring now to FIG. 6, there is shown a top plan view of one end cap 304 of the canister 100, wherein center hole 306 can be seen.

Figure 7:
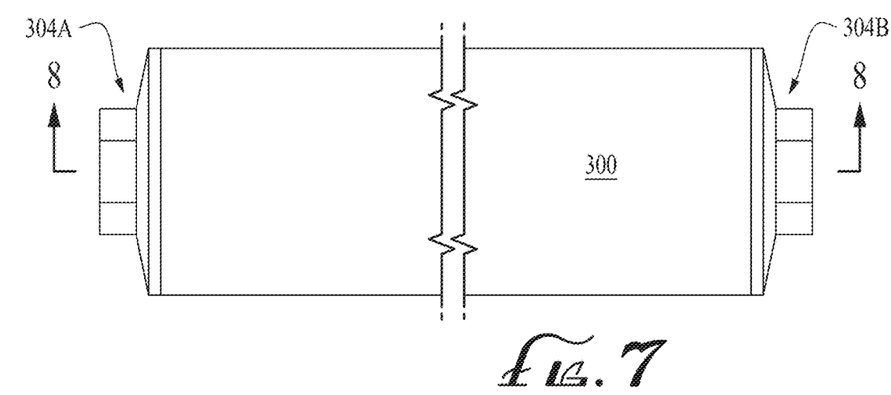
FIG. 7 is a side plan view of the canister of FIG. 1.

Referring now to FIG. 7, there is shown a side view of the canister 100 with the end caps 304 installed.

Figure 8:
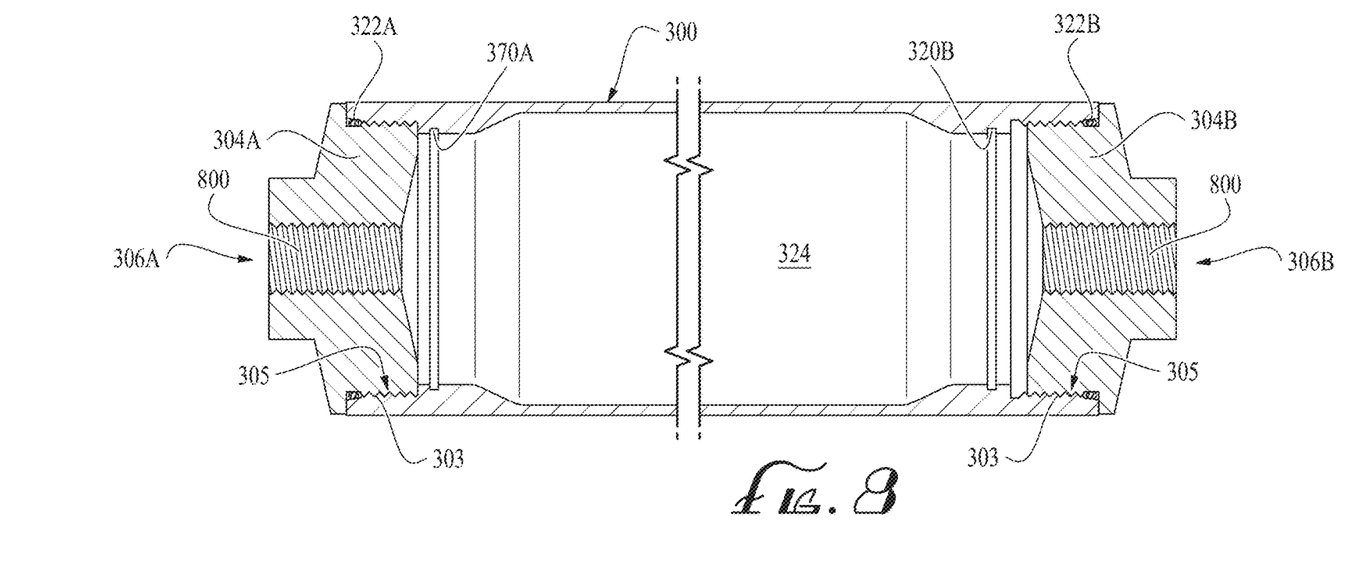
FIG. 8 is a sectional view of the canister of FIG. 7, taken along line 8-8.

Referring now to FIG. 8, there is shown a sectional view of the canister 100 of FIG. 7, wherein the hollow body 300 can be seen in greater detail, and the end caps 304A, 304B are threadedly connected thereto. Threading 303 and 305 removably secure the caps 304 to the body 300. Additionally, as discussed above, the caps 304 have holes/openings 306 therethrough, and those holes/openings have their own threading 800 for threadedly and removably coupling to fittings 308A, 308B.

As best seen in FIGS. 8 through 11, each of the opposed ends 302A, 302B of the body section 300 has a multi-stepped or multi-tiered configuration that forms at least one first recess 320A, 320B in the internal sidewall of the ends 302A, 302B. Each first recess 320A, 320B is configured to hold and retain at least one snap ring 314. The diameters of the fine mesh screen 310 and support structure 312 are greater than the inner diameter of the snap ring 314. As such, when the snap rings 314 are installed in their recesses 320A, 320B, the screens 310 and support structures 312 are retained within the body 300 and cannot be removed unless the corresponding snap ring 314 is removed first. However, as noted above, the use of one or more snap rings 314 is optional, and the fine mesh screens 310 and support structures 312 can be held in place simply by securing the end caps 304A, 304B to the body 300. This positioning of the mesh screens 310 and the support structures 312 are what retain the media 900 within the canister 100.

Below the first recesses 320/further along the interior of the body 300, an interior surface of the body/housing 300 flares outward, towards the outer wall/surface of the body 300, increasing the interior diameter of the housing 300 and forming the media chamber 324.

The media 900 can be any media that absorbs fume, odors or vapors. Preferably the media 900 comprises charcoal, activated charcoal and/or activated carbon, and more preferably the media 900 comprises a 50/50 mixture between coconut shell granular charcoal and bituminous coal pellet charcoal. The coconut shell charcoal can be 4×8 mesh and the bituminous coal pellet charcoal can be 4 mm pellets. Optionally wood charcoal can also be used, and the media 900 can be any combination of the aforementioned charcoal types, in any combination and/or ratio, and in any mesh size or pellet formation. Optionally, the media 900 is contained in a netted/permeable bag to allow ease of insertion and removal from the canister 100 when being replaced.

Assembly of the canister 100 is as follows: First, the housing 300 is provided and either: one of the snap rings 314 is inserted into the first recess 320A proximate the first open end of the housing 300, or, an O-ring 316A is coupled one of the end caps 304A, and the end cap 304A is secured to one end of the housing 300. Then, the housing 300 is positioned in a vertical orientation, such that the first open end 302A is beneath and the second open end 302B, which is facing up. Then, the first structure 312A is placed inside the housing 300, through the second open end 302B and slid down the inside of the housing 300 until it is resting against either: the first snap ring 314A proximate the first open end 302A of the housing 300, or the end cap 304A. Then, the first fine mesh screen 310A is slid through the second open end 302B of the housing 300 until it is resting against the first structure 312A. Next, media 900 is placed inside the housing 900 until the media 900 level reaches the outermost edge of the second open end 302B. Then, while still in the vertical position, the housing 300 is tapped hard against a surface to settle the media 900 within the housing 300. Once the media 900 is below the first recess 320B proximate the second open end 302B, the second fine mesh screen 310B is inserted on top of the media 900, then the second structure 312B is inserted on top of the second fine mesh screen 310B. Optionally, the second snap ring 314B is inserted and retained within the first recess 320B proximate the second open end 302B.

Next, if snap rings 314 were used, then the first end cap 304A has not been previously installed, and an O-ring 316A, 316B is coupled to each end cap 304A, 304B, the threading 305 on the end caps 304A, 304B is lubricated with di-electric grease and then the end caps 304A, 304B are threadedly coupled to their respective ends 302A, 302B of the housing 300. If no snap rings 314 were used, then only the prior mentioned steps with respect to the second O-ring 316B and the second end cap 304B are completed at this time.

And finally, the optional shipping caps 318 are threaded into each of the center holes 306A, 306B of the end caps 304A, 304B.

It should be noted that while the steps described above start with the first open end 302A and its components, the user can choose to start with the second open end 302B and its components, and then fill the housing 300 with material 900 through the first open end 302A. Additionally, the steps listed can be performed in different order and the method is not limited to the specific order of steps recited above.

Optionally, one of the end caps 304 can be permanently coupled to the housing 300, and one of the snap rings 314, fine mesh screens 310 and structures 312 can be permanently retained therein, so that the user only has to remove one end cap 304, one snap ring 314, one structure 312 and one fine mesh screen 310 to remove old media 900 and insert new, fresh media 900.

The canister 100 is used by coupling the canister 100 to a gas tank 102 along the gas tanks' vent line 106. This way, any fumes/vapors that attempt to leave the gas tank 102 must pass through the canister 100, and the canister 100 collects most if not all of those fumes/vapors, reducing the amount of fumes/vapor that are released to the ambient air while still allowing air flow.

The canister 100 of the present invention has the following advantages:

Known vapor canisters are considered single use, and once the media contained therein becomes saturated with raw fuel/gas fumes and vapor, the canister no longer properly functions as a filter.

In stark contrast, the canister 100 of the present invention is reusable/rechargeable in that, once the media 900 within the canister 100 becomes saturated, the media 900 can be removed and replaced with fresh, unsaturated media 900. This not only saves the consumer on costs because they do not have to replace the entire canister once it becomes saturated, but the canister 100 of the present invention is also environmentally friendly as less used vapor canisters are added to landfills, only the used media 900 needs to be recycled/disposed of.

Most known canisters are plastic while the canister 100 of the present invention is preferably made from aluminum, making it stronger and less susceptible to damage.

Additionally, the canister 100 can hold more media 900 than known canisters, increasing its lifespan.

Moreover, the canister 100 is modular, meaning that its various components can be replaced if they wear out and/or fail, as opposed to known canisters where the entire canister must be thrown away and replaced if a component wears out and/or fails.

Additionally, the canister 100 is universal, meaning it can be used with all makes and models of vehicles, including boats, generators, and other motorsports vehicles. This is due to the center holes in each of the end caps 304A, 304B Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference.

What is claimed is:

1. A reusable vapor canister comprising:
    a) a hollow body section having two opposed ends and a single media cavity, wherein each opposed end has internal threading and at least one first recess;
    b) two end caps configured to removably couple to the opposed ends of the body, each end cap having at least one hole disposed therethrough and threading along one end portion;
    c) at least two fine mesh screens;
    d) at least two support structures;
    e) at least two snap rings; and
    f) at least two O-rings.

2. The canister of claim 1, further comprising media disposed within the media cavity.

3. The canister of claim 2, wherein the media comprises one or more of the following: charcoal, activated charcoal, or activated carbon.

4. The canister of claim 2, wherein the media comprises a 50/50 mixture between coconut shell granular charcoal and bituminous coal pellet charcoal.

5. The canister of claim 1, wherein the canister is a fuel vapor canister and the media cavity is substantially cylindrical in shape.

6. The canister of claim 1, wherein the at least two fine mesh screens, the at least two support structures, the at least two snap rings, and the at least two O-rings are proximate the opposed ends of the body section.

7. A method of using the vapor canister of claim 1, the method comprising the steps of:
    a) providing the vapor canister of claim 1; and
    b) coupling the vapor canister to a vent line of a fuel tank.

8. A method of reusing the vapor canister of claim 1, the method comprising the steps of:
    a) providing the vapor canister;
    b) removing at least one end cap from the body;
    c) removing at least one snap ring from the body;
    d) removing at least one supporting structure from the body;
    e) removing at least one fine mesh screen from the body;
    f) removing at least some media from the media cavity;
    g) inserting at least some new, unused media into the media cavity;
    h) placing at least one fine mesh screen into the body, on top of the media;
    i) placing at least one supporting structure on top of the fine mesh screen;

j) inserting at least one snap ring into the first recess of the body; and k) securing the end cap to the body.

9. A reusable vapor canister comprising:
a) a hollow body section having two opposed ends and a single media cavity;
b) two end caps, wherein at least one of the end caps is configured to removably couple to one of the opposed ends of the body, each end cap having at least one hole disposed therethrough, wherein at least one of the opposed ends of the body has internal threading;
c) at least two fine mesh screens;
d) at least two support structures; and
e) at least two O-rings.

10. The canister of claim 9, wherein at least one of the end caps has threading along one end portion.

11. The canister of claim 9, wherein each opposed end of the body has at least one first recess configured to receive and retain at least one snap ring.

12. The canister of claim 9, further comprising media disposed within the media cavity.

13. The canister of claim 12, wherein the media comprises one or more of the following: charcoal, activated charcoal, or activated carbon.

14. The canister of claim 12, wherein the media comprises a 50/50 mixture between coconut shell granular charcoal and bituminous coal pellet charcoal.

15. The cannister of claim 9, further comprising at least one snap ring.

16. The canister of claim 9, wherein the canister is a fuel vapor canister and the media cavity is substantially cylindrical in shape.

17. The canister of claim 9, wherein the at least two fine mesh screens, the at least two support structures, and the at least two O-rings are proximate the opposed ends of the body section.

18. A method of using the vapor canister of claim 9, the method comprising the steps of:
a) providing the vapor canister of claim 9; and
b) coupling the vapor canister to a vent line of a fuel tank.

19. A method of reusing the vapor canister of claim 9, the method comprising the steps of:
a) providing the vapor canister;
b) removing at least one end cap from the body;
c) removing at least one supporting structure from the body;
d) removing at least one fine mesh screen from the body;
e) removing at least some media from the media cavity;
f) inserting at least some new, unused media into the media cavity;
g) placing at least one fine mesh screen into the body, on top of the media;
h) placing at least one supporting structure on top of the fine mesh screen; and
i) securing the end cap to the body.

* * * * *